US012581142B2

(12) United States Patent
Morgan et al.

(10) Patent No.: US 12,581,142 B2
(45) Date of Patent: Mar. 17, 2026

(54) APPROACHES FOR COMPRESSING AND DISTRIBUTING IMAGE DATA

(71) Applicant: Palantir Technologies Inc., Denver, CO (US)

(72) Inventors: Nicholas Morgan, San Francisco, CA (US); Dylan Howell, New York, NY (US); Ezra Zigmond, Palo Alto, CA (US); John Garrod, Brentwood, TN (US); Katherine Brainard, East Orange, NJ (US); Praveen Kumar Ramalingam, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 486 days.

(21) Appl. No.: 17/958,721

(22) Filed: Oct. 3, 2022

(65) Prior Publication Data

US 2023/0045218 A1     Feb. 9, 2023

Related U.S. Application Data

(63) Continuation-in-part of application No. 16/903,926, filed on Jun. 17, 2020, now abandoned.

(51) Int. Cl.
*H04N 21/2343*     (2011.01)
*H04N 21/44*     (2011.01)
*H04N 21/4402*     (2011.01)

(52) U.S. Cl.
CPC .............. *H04N 21/234345* (2013.01); *H04N 21/44004* (2013.01); *H04N 21/4402* (2013.01)

(58) Field of Classification Search
CPC .... H04N 19/119; H04N 19/167; H04N 19/17; H04N 19/186; H04N 19/61; H04N 21/234345; H04N 21/44004; H04N 21/4402; H04N 21/8547
See application file for complete search history.

(56) References Cited

U.S. PATENT DOCUMENTS

| | | | |
|---|---|---|---|
| 5,086,439 A | 2/1992 | Asai et al. | |
| 6,172,672 B1 * | 1/2001 | Ramasubramanian | ...................... H04N 21/2402 348/14.14 |
| 7,224,891 B1 | 5/2007 | Jam et al. | |
| 2002/0118949 A1 | 8/2002 | Jones | |
| 2005/0135781 A1 | 6/2005 | Takahashi | |

(Continued)

OTHER PUBLICATIONS

Examination Report dated Oct. 2, 2024, issued in related European Patent Application No. 21179903.6 (5 pages).

(Continued)

*Primary Examiner* — Zhiyu Lu
(74) *Attorney, Agent, or Firm* — Sheppard Mullin Richter & Hampton LLP

(57)     ABSTRACT

Systems and methods are provided for obtaining a set of images representing a view of a geographic region to be compressed, the set of images including a first image and a second image. A first image file can be generated based on the set of images, wherein the first image is encoded in a first color channel associated with the image file, and wherein the second image is encoded in a second color channel associated with the image file. A video file can be generated based at least in part on the image file. The video file can be provided to a client device over one or more computer networks.

18 Claims, 12 Drawing Sheets

(56) References Cited

U.S. PATENT DOCUMENTS

| | | | |
|---|---|---|---|
| 2006/0104526 | A1 | 5/2006 | Gringeler et al. |
| 2009/0291707 | A1 | 11/2009 | Choi et al. |
| 2010/0119175 | A1* | 5/2010 | Tsang .................. H04N 19/597 |
| | | | 382/294 |
| 2010/0240351 | A1 | 9/2010 | Kumar et al. |
| 2010/0295966 | A1 | 11/2010 | Furlan et al. |
| 2011/0150330 | A1 | 6/2011 | Jannard et al. |
| 2012/0087560 | A1 | 4/2012 | Poon et al. |
| 2012/0169842 | A1 | 7/2012 | Chuang et al. |
| 2013/0335352 | A1 | 12/2013 | Sako et al. |
| 2016/0064035 | A1 | 3/2016 | Bostick et al. |
| 2019/0028722 | A1 | 1/2019 | Choi et al. |
| 2019/0108665 | A1 | 4/2019 | Williams et al. |
| 2020/0204734 | A1* | 6/2020 | Binder .................. H04N 23/58 |

OTHER PUBLICATIONS

Paul Maenner, "Emerging standards suite for wide-area ISR," Full Motion Video (FMV) Workflows and Technologies for Intelligence, Surveillance, and Reconnaissance (ISR) and Situational Awareness, SPIE, 1000 20th St. Bellingham WA 98225-6705 USA, vol. 8386, No. 1, May 11, 2012, pp. 1-9.

* cited by examiner

100

400

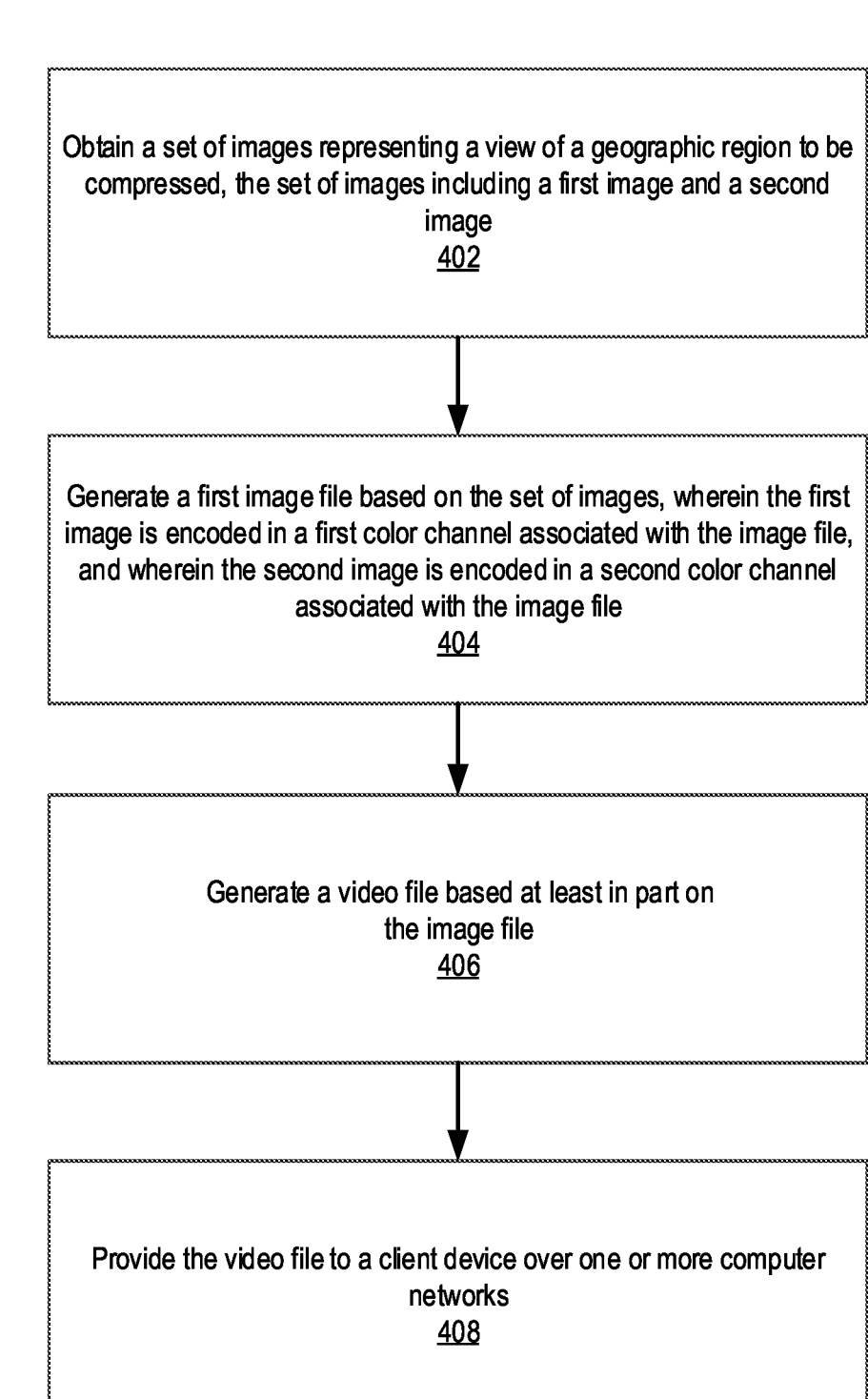

Obtain a set of images representing a view of a geographic region to be compressed, the set of images including a first image and a second image
402

Generate a first image file based on the set of images, wherein the first image is encoded in a first color channel associated with the image file, and wherein the second image is encoded in a second color channel associated with the image file
404

Generate a video file based at least in part on the image file
406

Provide the video file to a client device over one or more computer networks
408

FIGURE 4A

450

Access an encoded video file, wherein a first video frame of the encoded video file encodes a first image file
452

Extract the first image file from the first video frame of the encoded video file, wherein the first image file encodes at least a first tile of a first tiled frame in a first color channel and a first tile of a second tiled frame in a second color channel
454

Extract at least the first tile of the first tiled frame and the first tile of the second tiled frame from the first image file
456

Provide access to at least the first tile of the first tiled frame and the first tile of the second tiled frame
458

FIGURE 4B

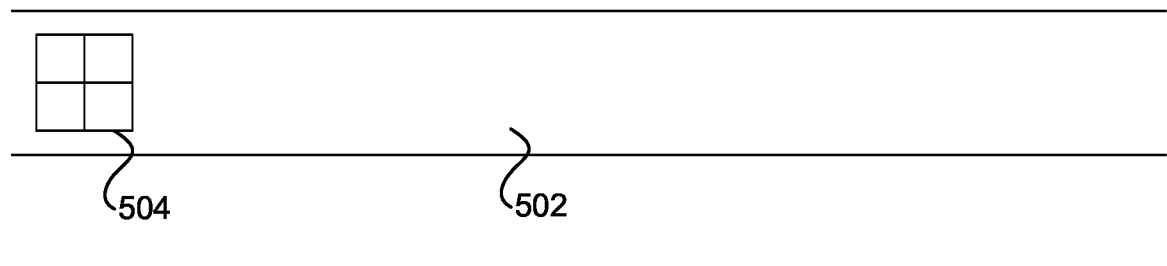
504        502
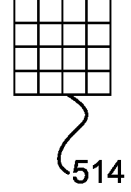
514
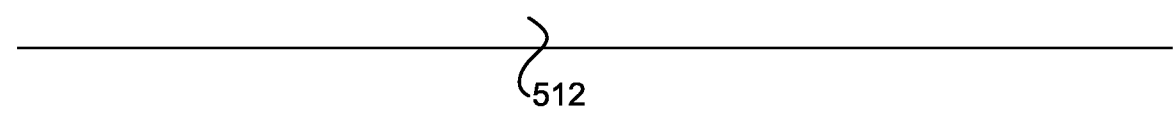
512
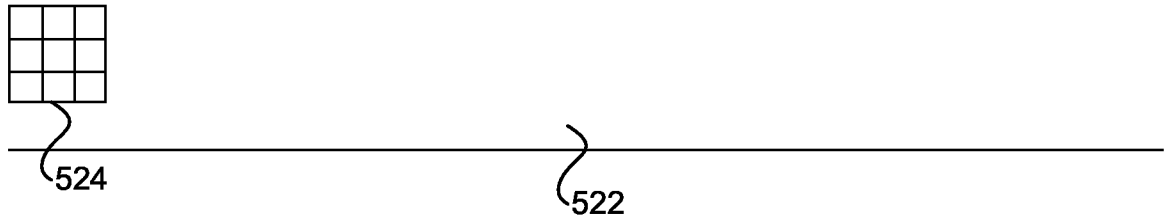
524        522
FIGURE 5

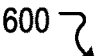
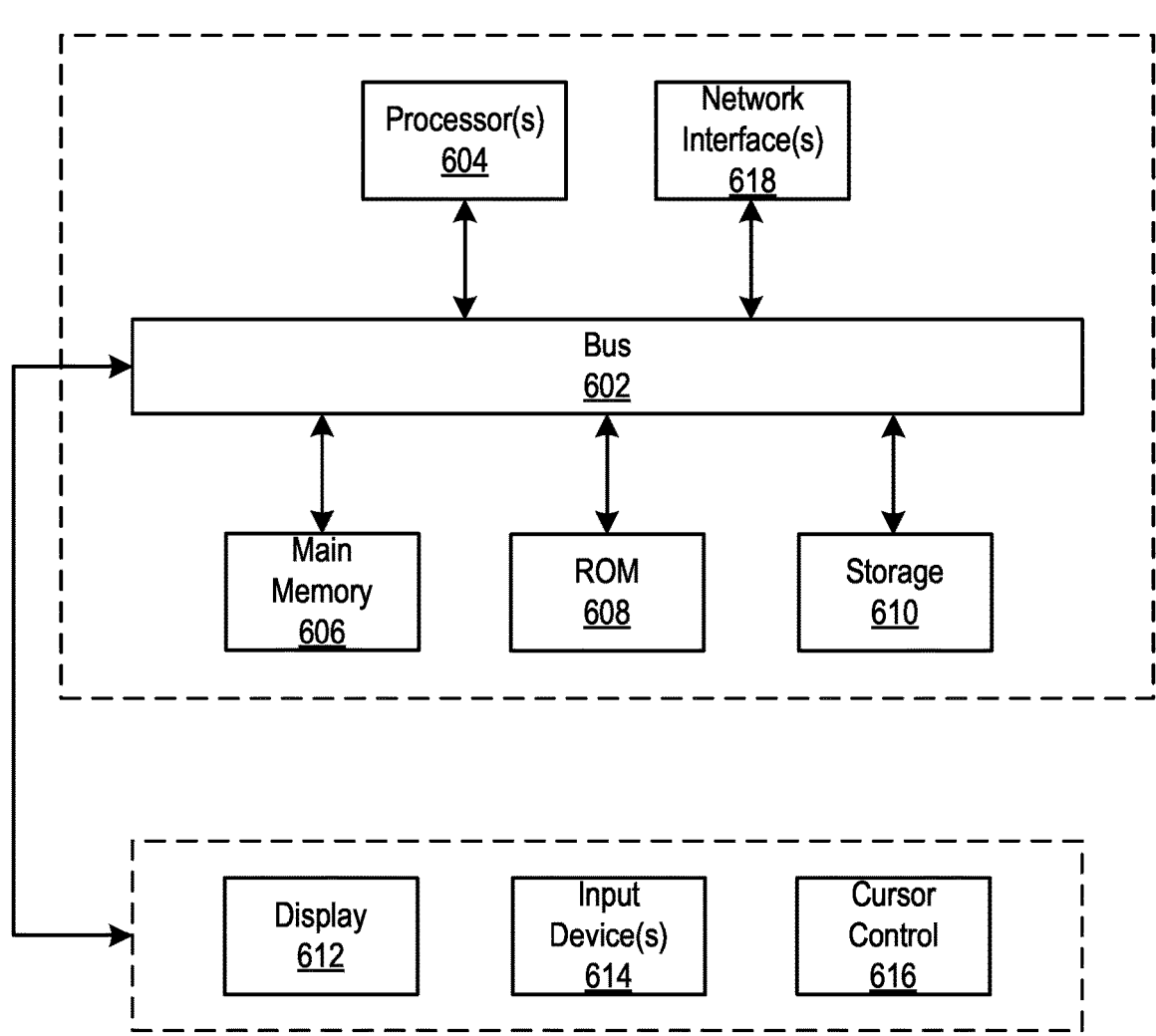
FIGURE 6

APPROACHES FOR COMPRESSING AND DISTRIBUTING IMAGE DATA

CROSS REFERENCE TO RELATED APPLICATIONS

This application is a continuation-in-part application of U.S. patent application Ser. No. 16/903,926, filed Jun. 17, 2020, the content of which is incorporated by reference in its entirety into the present disclosure.

FIELD OF THE INVENTION

This disclosure relates to approaches for compressing and distributing image data.

BACKGROUND

Conventional approaches for wide-area motion imagery (WAMI) are capable of generating aerial images of large geographic areas at low frame rates. For example, an aircraft can be equipped with one or more WAMI sensors. Each WAMI sensor can image an assigned portion of a geographic area in real time. In general, a WAMI sensor may produce images at a rate of 1 Hz or faster from one or more cameras associated with the WAMI sensor. A system can seamlessly stitch together images collected by the WAMI sensor to generate one or more wide-area images.

SUMMARY

Various embodiments of the present disclosure can include systems, methods, and non-transitory computer readable media configured to obtain a set of images representing a view of a geographic region to be compressed, the set of images including a first image and a second image; generate a first image file based on the set of images, wherein the first image is encoded in a first color channel associated with the image file, and wherein the second image is encoded in a second color channel associated with the image file; generate a video file based at least in part on the image file; and provide the video file to a client device over one or more computer networks.

In an embodiment, the set of images includes a third image, and wherein the third image is encoded in a third color channel associated with the image file.

In an embodiment, the first, second, and third images are grayscale images.

In an embodiment, the systems, methods, and non-transitory computer readable media are further configured to generate a first set of tiles that segment a first wide-area motion image of a portion of the geographic region; generate a second set of tiles that segment a second wide-area motion image of the portion of the geographic region; wherein the first wide-area motion image corresponds to a tile in the first set of tiles; and wherein the second wide-area motion image corresponds to a tile in the second set of tiles.

In an embodiment, the first wide-area motion image and the second wide-area motion image were captured successively in time.

In an embodiment, the first wide-area motion image and the second wide-area motion image correspond to a particular zoom level at which the geographic region was imaged.

In an embodiment, generating the video file further includes generating a first video frame of the video file based on the image file.

In an embodiment, the systems, methods, and non-transitory computer readable media are further configured to generate a second image file based on a second set of images and generate a second video frame of the video file based on the second image file.

In an embodiment, the systems, methods, and non-transitory computer readable media are further configured to associating the video file with the geographic region and a timestamp indicating when the set of images were captured and storing the video file.

In an embodiment, the systems, methods, and non-transitory computer readable media are further configured to determine a request for image data associated with the geographic region from a second client device; determine the stored video file satisfies the request from the second client device; and providing the video file to the second client device over one or more computer networks.

Various embodiments of the present disclosure can include systems, methods, and non-transitory computer readable media configured to access an encoded video file, wherein a first video frame of the encoded video file encodes a first image file; extract the first image file from the first video frame of the encoded video file, wherein the first image file encodes at least a first tile of a first tiled frame in a first color channel and a first tile of a second tiled frame in a second color channel; extract at least the first tile of the first tiled frame and the first tile of the second tiled frame from the first image file; and provide access to at least the first tile of the first tiled frame and the first tile of the second tiled frame.

In an embodiment, the first image file encodes a first tile of a third tiled frame in a third color channel.

In an embodiment, the first image file is a Joint Photographic Experts Group (JPEG) image file.

In an embodiment, the first tile of the first tiled frame and the first tile of the second tile frame are in grayscale.

In an embodiment, the first tile of the first tiled frame and the first tile of the second tile frame are captured successively in time.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4A illustrates a flowchart of an example method, in accordance with various embodiments of the present technology.

FIG. 4B illustrates a flowchart of another example method, in accordance with various embodiments of the present technology.

FIG. 5 illustrates example diagrams of adaptive transmission depending on bandwidth of a network, in accordance with various embodiments of the present technology.

FIG. 6 illustrates a block diagram of an example computer system in which any of the embodiments described herein may be implemented.

DETAILED DESCRIPTION

Figure 1A:
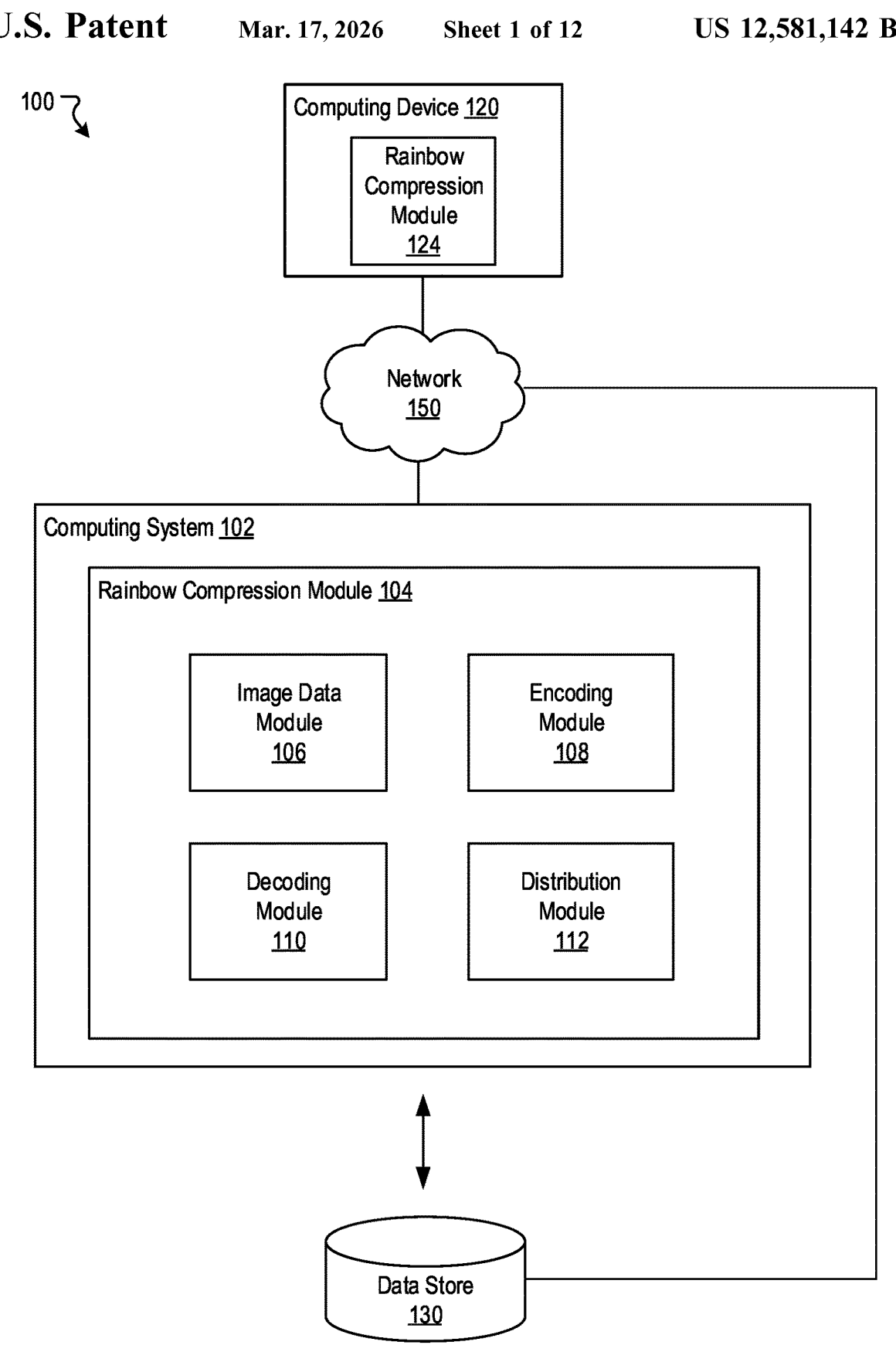
FIG. 1A illustrates an example computing environment, in accordance with various embodiments of the present technology.

Conventional approaches for wide-area motion imagery (WAMI) are capable of generating aerial images of large geographic areas at low frame rates. For example, an aircraft can be equipped with one or more WAMI sensors. Each WAMI sensor can image an assigned portion of a geographic area in real time. In general, a WAMI sensor may produce images at a rate of 1 Hz or faster from one or more cameras associated with the WAMI sensor. A system can seamlessly stitch together images collected by the WAMI sensor to generate one or more wide-area images. Under conventional approaches, distributing WAMI data over computer networks can especially be challenging due to wide-area images typically having large file sizes. For example, even when captured at low frame rates, WAMI data can be hundreds of gigabytes in size for every hour of imaging. As a result, it can be difficult to efficiently distribute WAMI data over computer networks when bandwidth is limited. In such instances, client devices are typically unable to play the captured WAMI data at appropriate playback speeds without experiencing high latency. Thus, an improved approach is needed to permit efficient distribution of high-resolution image data over computer networks and reproduction at client devices.

A claimed solution rooted in computer technology overcomes problems specifically arising in the realm of computer technology. In various embodiments, high-resolution image data (e.g., WAMI data) can be distributed efficiently over computer networks. For example, WAMI data can include images (or frames) that are divided into sets of tiles at various zoom levels. The images or frames may be stabilized in order to compensate for blurring attributed to pan, tilt, and/or rotation of the WAMI sensor. For example, the stabilization may encompass motion estimation, motion smoothing, and frame warping or frame rendering. In some examples, motion estimation and motion smoothing may encompass generating warping fields for each frame. The warping fields may be utilized to warp the frames. If the warping causes missing pixels, then pixels from adjacent frames may be projected to each of the frames using optical flow estimation. The frame warping or frame rendering process may encompass estimating dense warp fields from neighboring frames and synthesizing the stabilized frame by merging the warped contents.

A number of tiles per image or per frame, and/or a zoom level, may be determined dynamically based on current bandwidth and/or traffic of the computer network and/or required frame rate. In this example, a client device can be sent one or more tiles corresponding to a geographic region as requested for some zoom level. As mentioned, transmitting WAMI data over computer networks can be difficult due to the large file sizes typically associated with WAMI data. As a result, a client device accessing WAMI data over computer networks can experience high latency which can prevent (or degrade) playback of WAMI frames. To improve distribution, in various embodiments, WAMI frame tiles can be encoded and distributed over computer networks in a video container format. For example, in some embodiments, WAMI frame tiles can be encoded as Joint Photographic Experts Group (JPEG) image files. For example, a JPEG image file is typically associated with three color channels (red, green, blue). In such embodiments, each WAMI frame tile is a grayscale image that can be encoded and/or mapped (hereinafter "encoded") into a color channel, either red, green, or blue, associated with a JPEG file. In other examples, the WAMI frame tiles may be encoded as YUV (luma, or brightness, blue, and red) image files, in which each WAMI frame tile is encoded in one of a luma, blue, or red channel of the YUV image file. In yet other examples, the WAMI frame tiles may be encoded as CMYK (cyan, magenta, yellow, and key, or black) image files, in which each WAMI frame tile is encoded in one of a cyan, magenta, yellow, or key channel of the CMYK image file. A compression factor of encoding each WAMI frame tile into a CMYK image file may be higher than that of encoding each WAMI frame tile into a RGB or a YUV image file, because the former has four channels whereas the latter has three channels.

Each WAMI frame tile may be mapped into a color channel of a JPEG file, with or without undergoing additional compression following the mapping. This additional compression may be manifested as lossless compression, such as entropy encoding, which may include Huffman coding and/or arithmetic coding.

Thus, each encoded JPEG file can be associated with a first WAMI frame tile encoded in a first color channel, a second WAMI frame tile encoded in a second color channel, and a third WAMI frame tile encoded in a third color channel. In some embodiments, a JPEG image file can be encoded to include the same tile from a set of three successive frames. These successive frames tend to be similar to one another which allows a single encoded JPEG image file to improve compression by threefold over storing WAMI frame tiles individually, due to the mapping of the WAMI frame tiles into different color channels alone, even without the additional compression. Next, one or more container files, such as video files, are generated based on the encoded JPEG image files to further improve compression. For example, a set of encoded JPEG image files that each include three WAMI frame tiles can be encoded into a single video file (e.g., H.264 MPEG video file). In some embodiments, each video frame in the video file represents an encoded JPEG image file. Thus, each video frame can be built from three grayscale WAMI frame tiles, for example, for some zoom level. As an example, a video file including three video frames, each of which is built from three grayscale WAMI frame tiles, contains nine WAMI frame tiles. In some examples, these nine WAMI frame tiles may be consecutive, meaning that these nine WAMI frame tiles were acquired or obtained at nine consecutive time points without any intervening frames in between. These encoded video files can be stored and managed by a server. These encoded video files are not played, but merely, serve as a transport mechanism across the computer network. For example, the encoded video files may be disabled or locked from being played, for instance, while being transported across the computer network. By disabling or locking the encoded video files from being played, data size of the encoded video files may be further reduced, which further eases the transport of these encoded video files. These encoded video files may result in an overall compression rate of approximately 97 percent compared to the original WAMI data. A client device can interact with the server to access WAMI data. When WAMI data associated with a particular geographic region is requested, the server can provide the client device with one or more video files that encode the corresponding WAMI data for the particular geographic region. The client device can decode the video files into WAMI data that can be viewed and played, for example, by extracting encoded JPEG image files from the video files, and then extracting WAMI frame tiles from color channels associated with the extracted JPEG image files. In some examples, a single video file may contain nine consecutive image frames, meaning that these nine consecutive image frames were acquired or obtained at sequential points in time, without any intervening image frames in between. As an illustrative example, a first video file may contain a first image frame through a ninth image frame. A second video file may contain a tenth image frame through an eighteenth image frame. For instance, if two image frames were acquired or obtained per second, then the first video file may contain image frames from a time point of zero seconds through a time point of four seconds, inclusive. The second video file may then contain image frames from a time point of 4.5 seconds through a time point of 8.5 seconds, inclusive. In some examples, in a scenario in which the image frames are encoded into a CMYK image file, a single video file may contain more than nine consecutive image frames, such as twelve or sixteen consecutive image frames. Metadata for frame information of the respective video files may be stored and associated with file names of the respective video files. For example, the metadata may include an indication which sequential image frames are encompassed within each of the respective video files and a spatial and/or temporal relationship of each of the respective video files with respect to the other video files. In particular, the first video file may include, or be associated with, stored metadata that the first video file appears first spatially and/or temporally with respect to the other video files, and/or that the first video file contains image frames from the time point of zero seconds through the time point of four seconds. In particular, the second video file may include, or be associated with, stored metadata that the second video file appears second spatially and/or temporally with respect to the other video files, directly in between the first video file and a third video file, and/or that the second video file contains image frames from the time point of 4.5 seconds through the time point of 8.5 seconds. The metadata in each video file may further include one or more timestamps, access control privileges, storage locations, paths, and/or other characteristics or contextual information of each video file. In some embodiments, client devices can locally cache encoded video files which require less storage space than caching conventional WAMI data. While the examples herein refer to WAMI data, the approaches described herein can be applied to any high-resolution image data that can be processed as a set of tiles.

FIG. 1A illustrates an example environment 100, in accordance with various embodiments. The example environment 100 can include at least a computing system 102 and at least one computing device 120. The computing system 102 and the computing device 120 can each include one or more processors and memory. The processors can be configured to perform various operations by interpreting machine-readable instructions. The computing system 102 can include a rainbow compression module 104 that can be configured to encode and decode image data. The rainbow compression module 104 can include an image data module 106, an encoding module 108, a decoding module 110, and a distribution module 112. The image data module 106, encoding module 108, decoding module 110, and distribution module 112 can be executed by the processor(s) of the computing system 102 to perform various operations, as described below. In some embodiments, the rainbow compression module 104 can be implemented, in whole or in part, as software that is capable of running on one or more computing systems. In some embodiments, the rainbow compression module 104 can be implemented, in whole or in part, as software that is capable of running on one or more computing devices, such as the computing device 120. For example, in some embodiments, a rainbow compression module 124 that includes at least the decoding module 110 may be implemented in the computing device 120. The rainbow compression module 124 can decode encoded image data that is received by the computing device 120. In some embodiments, the rainbow compression module 104 can be implemented, in whole or in part, as software that is capable of running on one or more servers (e.g., cloud servers).

The computing system 102 can access a data store 130. In general, a data store may be any device in which data can be stored and from which data can be retrieved. In some embodiments, the data store 130 may store and manage various data, such as image data. The image data can include high-resolution image data, such as wide-area motion imagery (WAMI). Further, the image data may be segmented into respective sets of tiles for various zoom levels. The computing system 102, the computing device 120, and the data store 130 may be accessible either directly or over a network 150. The network 150 may be any wired or wireless network through which data can be sent and received (e.g., the Internet, local area network, etc.).

The rainbow compression module 104 can be configured to process requests received from the computing device 120. For example, the requests may be generated based on operations performed by a user operating the computing device 120 or from a software application running on the computing device 120. In various embodiments, such requests may seek image data from the computing system 102 over the network 150. For example, the user operating the computing device 120 may seek image data captured for some geographic region at some zoom level. In some examples, such requests may specify a permitted latency or range of latencies and/or a permitted frame rate or range of frame rates upon decoding. For example, the permitted latency or range of latencies may indicate a level of urgency of receiving the image data. The image data may be aerial images (e.g., WAMI frames) stored in the data store 130. The rainbow compression module 104 implemented by the computing system 102 can respond to the request by encoding and communicating the requested image data over the network 150. The computing device 120 can then decode and present the encoded image data. Particular attributes and/or characteristics of the compression may be adjusted depending on the permitted latency or range of latencies, the permitted frame rate or range of frame rates, and/or current or available bandwidth, or one or more current traffic attributes over the network 150. More details discussing embodiments of the present technology are provided below.

The image data module 106 can be configured to process requests for image data. For example, a request for image data can seek image data corresponding to some geographic region for some period of time. In this example, the image data module 106 can obtain image data (e.g., frames, WAMI frames) responsive to the request from the data store 130. In various embodiments, the image data can be tiled for various zoom levels based on conventional approaches. For example, a WAMI frame of a geographic region may be captured at various zoom levels. The WAMI frame can be divided into a set of tiles based on zoom level. For example, at zoom level 0, the WAMI frame can remain as one tile. At zoom level 1, the WAMI frame can be divided into four tiles. Each tile can represent pixels corresponding to some portion of the WAMI frame. In some embodiments, each tile has the same pixel height and width (e.g., 256 pixels in width and 256 pixels in height). Generally, as the zoom level increases, so too does the number of tiles needed to represent a WAMI frame. For example, at zoom level 2, a WAMI frame can be divided into 16 tiles. In another example, at zoom level 3, a WAMI frame can be divided into 64 tiles. The zoom level, in some examples, may be inversely proportional to a tile size. Many variations are possible.

The encoding module 108 can be configured to encode image data. In various embodiments, the encoding module 108 can apply a two-phase encoding process that encodes the image data based on both image processing and video processing techniques. More details describing the encoding module 108 are provided below in reference to FIG. 1B.

The decoding module 110 can be configured to decode image data encoded by the encoding module 108. In various embodiments, the decoding module 101 can apply a two-phase decoding process that decodes the encoded image data based on both video processing and image processing techniques. More details describing the decoding module 110 are provided below in reference to FIG. 1C.

The distribution module 112 can be configured to communicate image data over the network 150. For example, image data requested by the computing device 120 can be encoded by the encoding module 108 and communicated to the computing device 120 over the network 150. The rainbow compression module 124 implemented by the computing device 120 can receive and decode the requested image data. The decoded image data can then be presented through the computing device 120. For example, a software application running on the computing device 120 (e.g., a media player) can present the decoded image data through an interface.

Figure 1B:
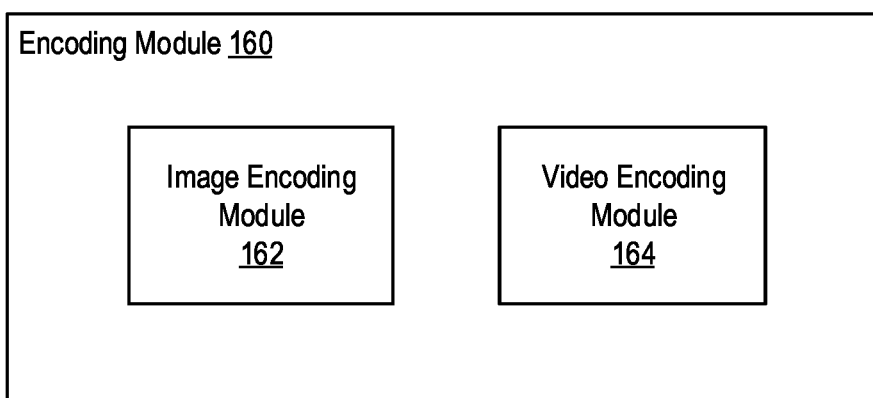
FIG. 1B illustrates an example encoding module, in accordance with various embodiments of the present technology.

FIG. 1B illustrates an example encoding module 160, in accordance with various embodiments. The encoding module 160 may be implemented as the encoding module 108 of FIG. 1A. In some embodiments, the encoding module 160 includes an image encoding module 162 and a video encoding module 164. As mentioned, the encoding module 160 can apply a two-phase encoding process that encodes image data based on both image processing and video processing techniques.

Figure 2A:
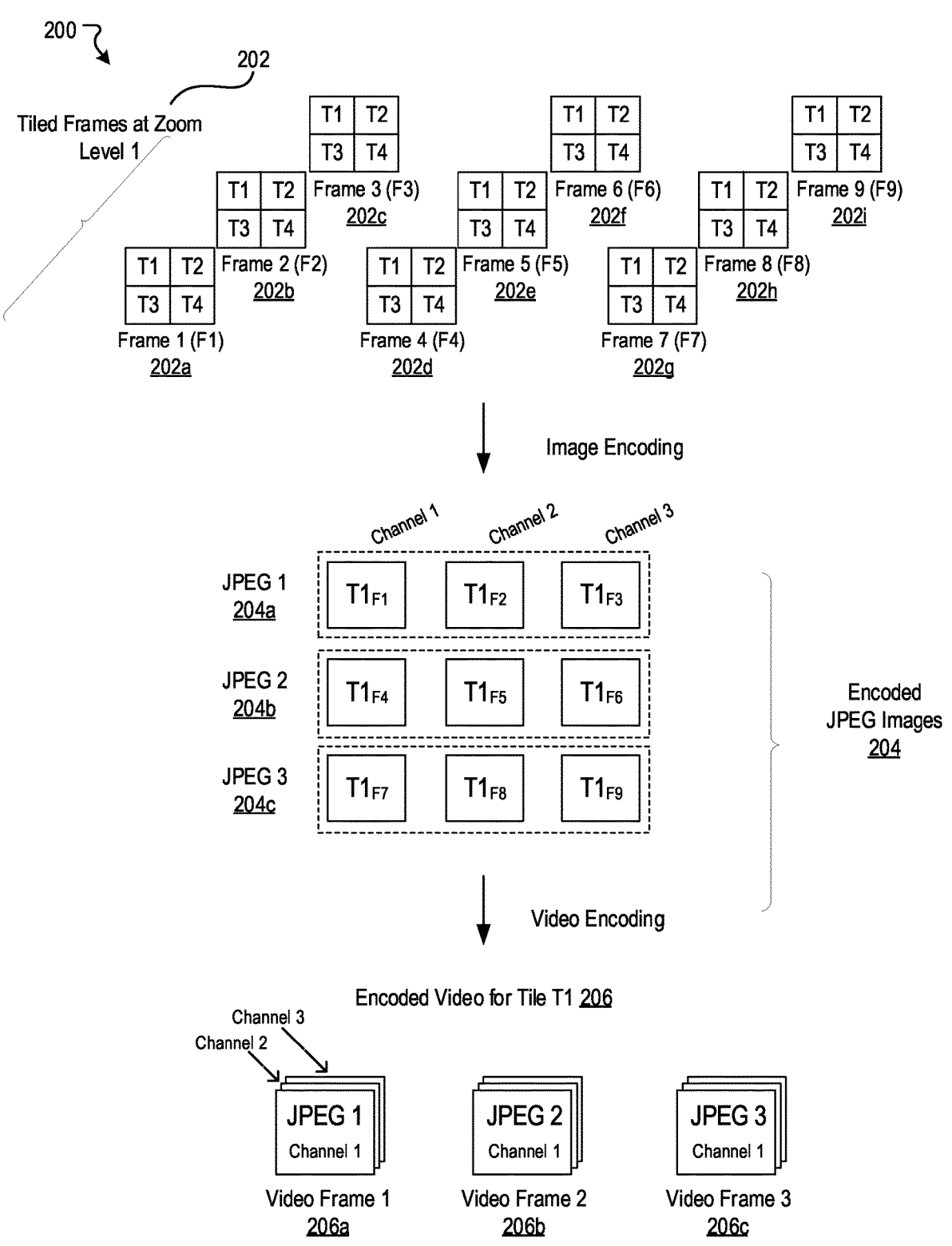
FIGS. 2A-2D illustrate example diagrams of an encoding process, in accordance with various embodiments of the present technology.

The image encoding module 162 can be configured to encode image data (e.g., WAMI frames) based on image processing techniques. As an example, the image data may be aerial frames representing some geographic region. The frames can be captured in grayscale and stored in a data store accessible to the image encoding module 162 (e.g., the data store 130 of FIG. 1A). Further, the frames can be tiled based on zoom level. As shown in the example 200 of FIG. 2A, the image encoding module 162 can encode a set of tiled frames 202 that were captured at different points in time. For example, the set of tiled frames 202 can include nine frames captured successively over a period of time. The set of tiled frames 202 can include a first tiled frame 202a captured at time $t_0$, a second tiled frame 202b captured at time $t_1$, a third tiled frame 202c captured at time $t_2$, a fourth tiled frame 202d captured at time $t_3$, a fifth tiled frame 202e captured at time $t_4$, a sixth tiled frame 202f captured at time $t_5$, a seventh tiled frame 202g captured at time $t_6$, an eighth tiled frame 202h captured at time $t_7$, and a ninth tiled frame 202i captured at time $t_8$. Many variations are possible. The image encoding module 162 can encode each frame in the set 202 into color channels associated with one or more image files. For example, the frames can be encoded into color channels associated with Joint Photographic Experts Group (JPEG) image files. In various embodiments, the image encoding module 162 encodes the same tile of each frame in the set 202 in the same JPEG image file, as illustrated in the example of FIG. 2A. For example, the image encoding module 162 can encode a first tile of the first tiled frame 202a ($T1_{F1}$) in a first color channel ("channel 1") of a first JPEG image file 204a, a first tile of the second tiled frame 202b ($T1_{F2}$) in a second color channel ("channel 2") of the first JPEG image file 204a, and a first tile of the third tiled frame 202c ($T1_{F3}$) in a third color channel ("channel 3") of the first JPEG image file 204a. As a result, three corresponding tiles from different frames can be encoded in a single JPEG image file. Continuing with this example, the image encoding module 162 can encode a first tile of the fourth tiled frame 202d ($T1_{F4}$) in a first color channel ("channel 1") of a second JPEG image file 204b, a first tile of the fifth tiled frame 202e ($T1_{F5}$) in a second color channel ("channel 2") of the second JPEG image file 204b, and a first tile of the sixth tiled frame 202f ($T1_{F6}$) in a third color channel ("channel 3") of the second JPEG image file 204b. In this example, the image encoding module 162 can further encode a first tile of the seventh tiled frame 202g ($T1_{F7}$) in a first color channel ("channel 1") of a third JPEG image file 204c, a first tile of the eighth tiled frame 202h ($T1_{F8}$) in a second color channel ("channel 2") of the third JPEG image file 204c, and a first tile of the ninth tiled frame 202i ($T1_{F9}$) in a third color channel ("channel 3") of the third JPEG image file 204c. Encoding or mapping frames to color channels in such a staggered manner results in an image that contains consecutive frames, in this example, three consecutive frames. Such a staggered approach may reduce or limit an amount of distortion introduced by the compression. The encoded JPEG image files 204 can further be encoded based on a second-phase video encoding process, as described below. The image encoding module 162 can similarly encode the remaining tiles T2, T3, T4 of the frames 202 into corresponding JPEG image files, which can further be encoded based on the second-phase video encoding process described below. While the examples herein reference JPEG image files, embodiments of the present technology can be applied to any type of image file that is associated with multiple color channels.

Figure 2B:
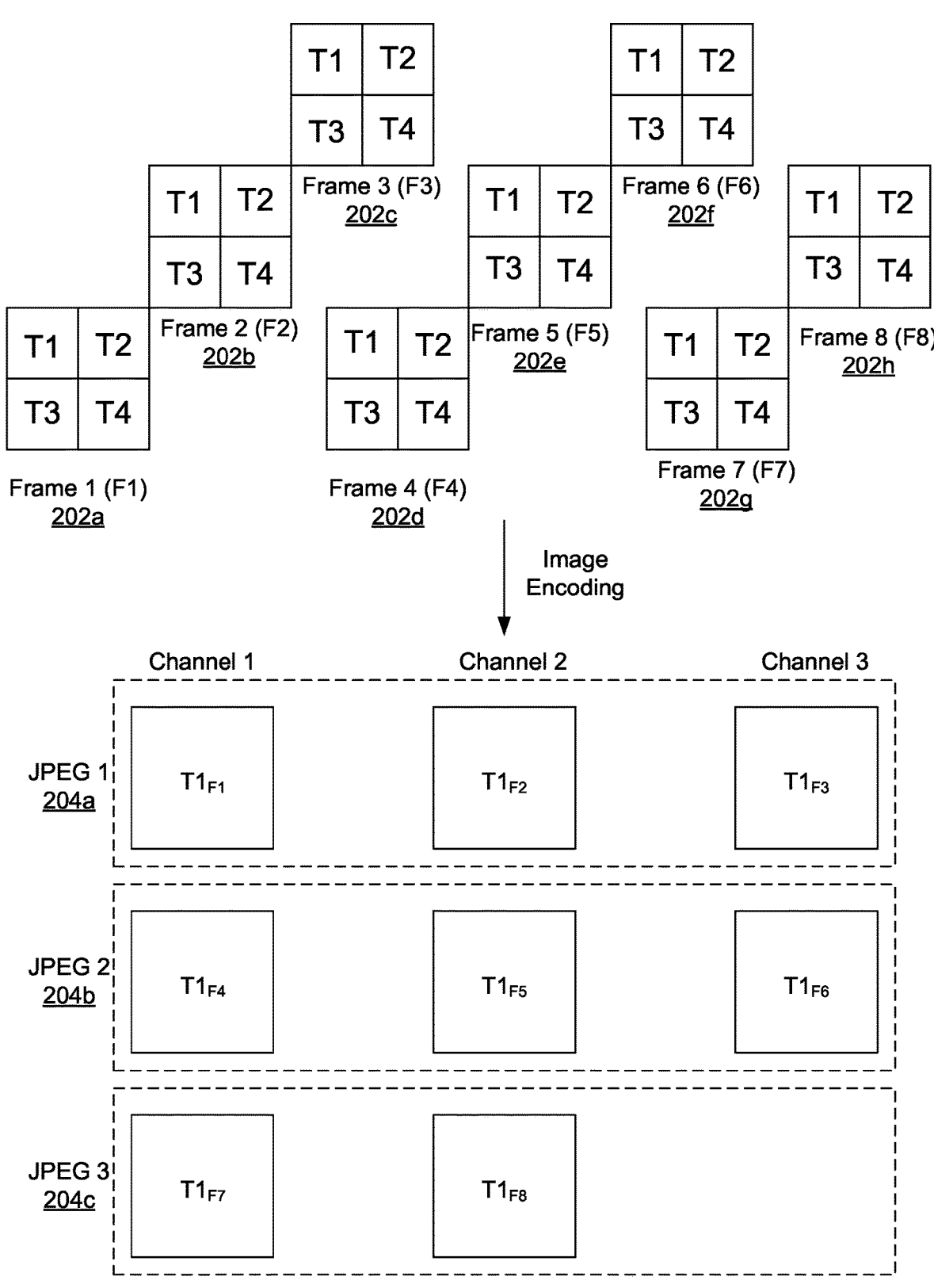

In some examples, a number of tiled frames fails to divide evenly into a number of channels. For example, in FIG. 2B, a total of eight tiled frames may be mapped into three color channels. Thus, if all tiled frames are mapped into a channel, one channel (e.g., the third color channel, channel 3) may have a different number of tiled frames mapped to that channel, resulting in a different compression ratio in the third color channel. More generally, for subsequent m successive frames beyond a first k or other set of k successive frames, wherein m is less than k, the subsequent m successive frames may either be dropped (e.g., removed or deleted and thereby not part of the mapping or compression), or the subsequent m successive frames may be mapped to m respective color channels until all the frames have been mapped. In some examples, such a determination of whether the subsequent m successive frames are to be dropped or mapped may depend, or be based on, a value of m, a total number of tiled frames, and/or a ratio between the value of m and the total number of tiled frames. In some examples, if the ratio between the value of m and the total number of tiled frames falls below a threshold proportion, such as one percent or ten percent, then either some or all of the subsequent m successive frames may be dropped. Thus, if the number of subsequent m successive frames is a small portion of the entire set of tiled frames, then dropping the subsequent m successive frames may have a smaller impact. In some other examples, instead of mapping the subsequent m successive frames, additional dummy frames may be added to the subsequent m successive frames until a sum of the subsequent m successive frames and the additional dummy frames reaches a total of k. In FIG. 2B, m is equal to two and k is equal to three.

Figure 2C:
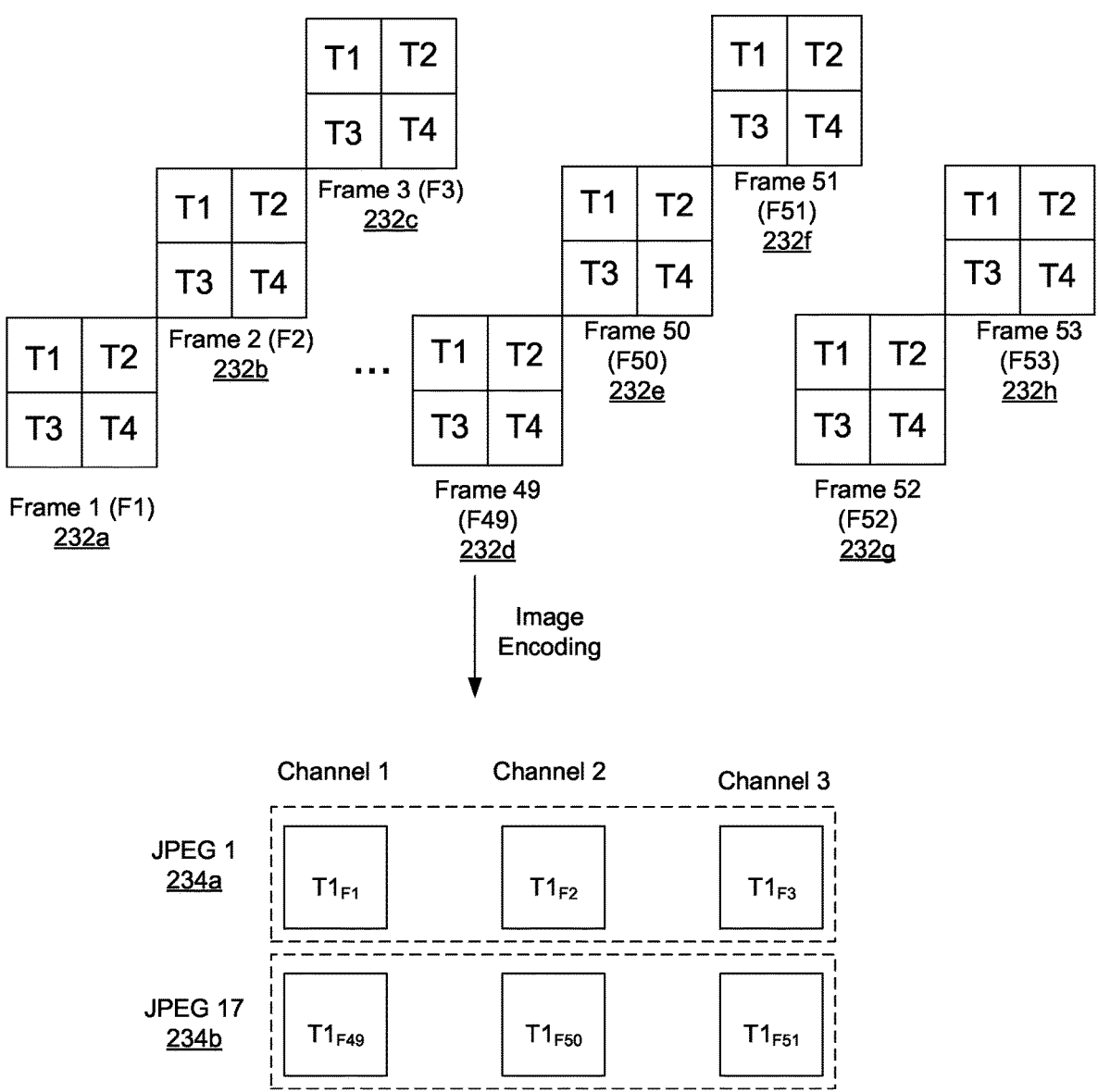
Figure 2D:
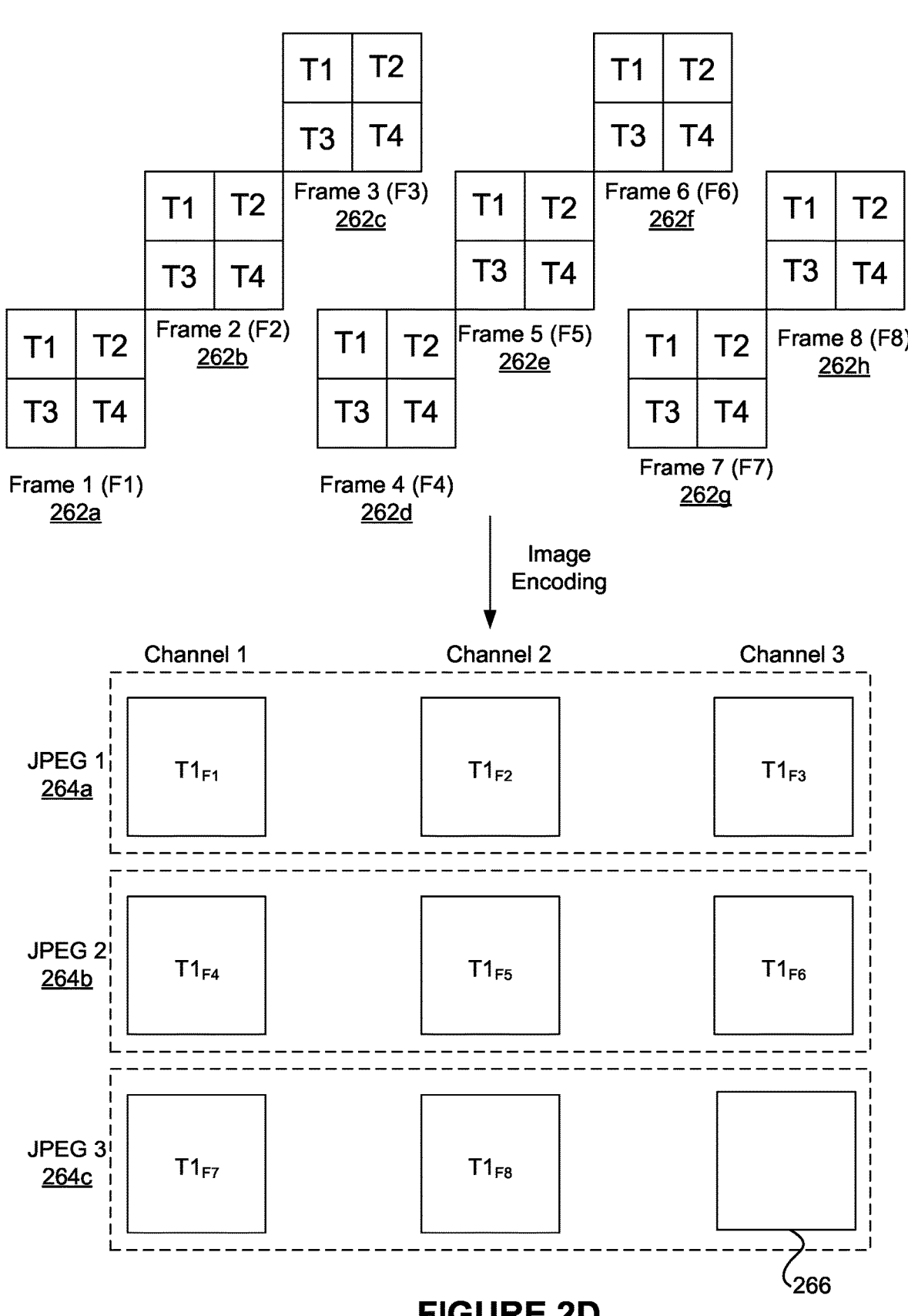

FIG. 2B illustrates a scenario in which m remaining frames, Frame 7 or 202g and Frame 8 or 202h, are retained in the third JPEG image file 204c, without being dropped or discarded. In FIG. 2B, the number of remaining frames is two and a total number of frames is eight. FIG. 2C illustrates a scenario in which remaining frames, Frame 52 or 232g and Frame 53 or 232h, are discarded. In FIG. 2C, a number of remaining frames is two while a total number of frames is 53. Thus, in FIG. 2C, a ratio of a number of remaining frames to a total number of frames is lower than in FIG. 2B, meaning that dropping the remaining two frames would have a smaller impact on an overall image or video sequence. In FIG. 2D, unlike in FIG. 2B, a dummy frame 266 may be added so that each channel has a same number of frames mapped.

The video encoding module 164 can be configured to further encode JPEG image files that were encoded by the image encoding module 162. For example, the video encoding module 164 can generate a video file where each frame in the video file represents a single JPEG image file. As a result, each frame in the video file can encode three corresponding tiles from different frames. For example, in the example 200 of FIG. 2A, the video encoding module 164 can encode the first JPEG image file 204a as a first frame 206a of a video file 206, the second JPEG image file 204b as a second frame 206b of the video file 206, and the third JPEG image file 204c as a third frame 206c of the video file 206. In this example, each video frame of the video file 206 represents three corresponding tiles from the different frames 202a, 202b, 202c, 202d, 202e, 202f, 202g, 202h, and 202i. Each video frame of the video file 206 may encompass or represent nonconsecutive or nonsequential tiled frames at nonconsecutive or nonsequential times while skipping a plurality of intervening tiled frames. For example, the first frame 206a may encompass or represent the first tiled frame 202a, the fourth tiled frame 202d, and the seventh tiled frame 202g, while skipping the second tiled frame 202b, the third tiled frame 202c, the fifth tiled frame 202e, the sixth tiled frame 202f, the eighth tiled frame 202h, and the ninth tiled frame 202i. The second frame 206b may encompass or represent the second tiled frame 202b, the fifth tiled frame 202e, and the eighth tiled frame 202h, while skipping the first tiled frame 202a, the third tiled frame 202c, the fourth tiled frame 202d, the sixth tiled frame 202f, the seventh tiled frame 202g, and the ninth tiled frame 202i. The third frame 206c may encompass or represent the third tiled frame 202c, the sixth tiled frame 202f, and the ninth tiled frame 202i, while skipping the first tiled frame 202a, the second tiled frame 202b, the fourth tiled frame 202d, the fifth tiled frame 202e, the seventh tiled frame 202g, and the eighth tiled frame 202h, Thus, as encoded, the video file 206 includes all T1 tiles representing the frames 202a, 202b, 202c, 202d, 202e, 202f, 202g, 202h, and 202i. The video encoding module 164 can similarly generate a separate video file for each of the remaining tiles T2, T3, T4 based on JPEG image files that encode those tiles, as described above. The video encoding module 164 can generate the video based on generally known approaches. For example, the video file may be generated as an H.264 MPEG video file. Many variations are possible.

Once generated, the encoded video file 206 can be provided over a computer network to client devices that request image data including the frames 202a, 202b, and 202c. In some embodiments, rather than encoding all of the tiles associated with a set of frames, only a requested portion of the set of frames can be encoded and provided to client devices. For example, a client device may seek access to image data representing a particular portion of a geographic region at a high zoom level, e.g., zoom level 20. In this example, rather than encoding all of the tiles of frames representing the geographic region at the high zoom level, a subset of the tiles representing the particular portion of the geographic region can be encoded and provided based on the approaches described herein.

Figure 1C:
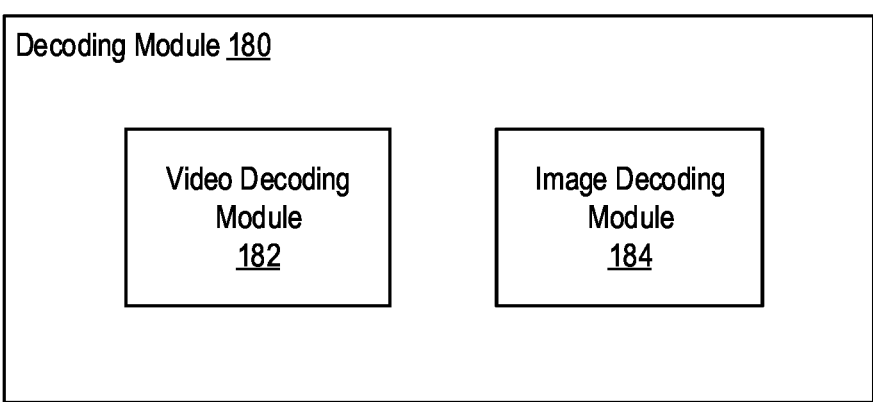
FIG. 1C illustrates an example decoding module, in accordance with various embodiments of the present technology.

FIG. 1C illustrates an example decoding module 180, in accordance with various embodiments. The decoding module 180 may be implemented as the decoding module 110 of FIG. 1A. In some embodiments, the decoding module 180 includes a video decoding module 182 and an image decoding module 184. The decoding module 180 can apply a two-phase decoding process that decodes image data based on both video processing and image processing techniques. In some embodiments, the decoding module 180 can be implemented by client devices that receive encoded image data from a computing system, such as the computing system 102 of FIG. 1A.

Figure 3:
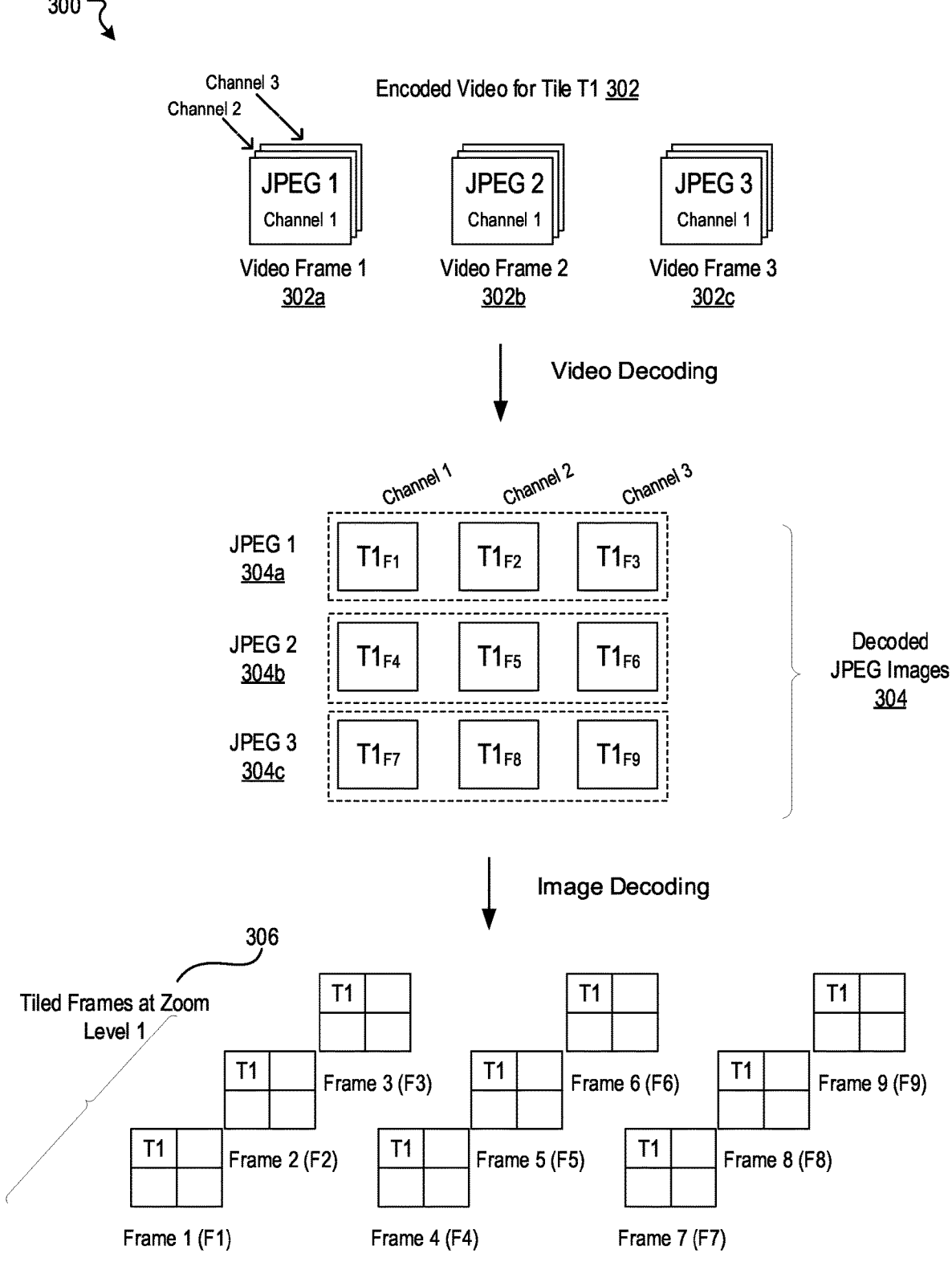
FIG. 3 illustrates an example diagram of a decoding process, in accordance with various embodiments of the present technology.

The video decoding module 182 can be configured to decode video files generated by the encoding module 160 of FIG. 1B. In various embodiments, the video decoding module 182 can extract video frames of an encoded video file 302, as illustrated in the example 300 of FIG. 3. As shown, the extracted video frames can include a first video frame 302a, second video frame 302b, and third video frame 302c. Each video frame represents a JPEG image file which encodes a first frame tile in a first color channel, a second frame tile in a second color channel, and a third frame tile in a third color channel, as described above.

The image decoding module 184 can be configured to decode JPEG image files encoded by the encoding module 160 of FIG. 1B. For example, in FIG. 3, a first JPEG image file 304a, which was extracted from the first video frame 302a, encodes a first tile of a first tiled frame ($T1_{F1}$) in a first color channel ("channel 1"), a first tile of a second tiled frame ($T1_{F2}$) in a second color channel ("channel 2"), and a first tile of a third tiled frame ($T1_{F3}$) in a third color channel ("channel 3"). Similarly, a second JPEG image file 304b, which was extracted from the second video frame 302b, encodes a first tile of a fourth tiled frame (T1$_{F4}$) in a first color channel ("channel 1"), a first tile of a fifth tiled frame (T1$_{F5}$) in a second color channel ("channel 2"), and a first tile of a sixth tiled frame (T1$_{F6}$) in a third color channel ("channel 3"). In this example, a third JPEG image file 304c, which was extracted from the third video frame 302c, encodes a first tile of a seventh tiled frame (T1$_{F7}$) in a first color channel ("channel 1"), a first tile of an eighth tiled frame (T1$_{F8}$) in a second color channel ("channel 2"), and a first tile of a ninth tiled frame (T1$_{F9}$) in a third color channel ("channel 3"). The image decoding module 184 can extract these encoded tiles to reconstruct a first tile (T1) for a set of tiled frames 306. The set of tiled frames 306 can be accessed (e.g., presented, viewed) by a client device. Further, the image decoding module 184 can extract encoded tiles for the remaining tiles T2, T3, T4 from corresponding videos that encode those tiles, as discussed in relation to the video encoding module 164.

FIG. 4A illustrates a flowchart of an example method 400, according to various embodiments of the present disclosure. The method 400 may be implemented in various environments including, for example, the environment 100 of FIG. 1A. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a set of images representing a view of a geographic region to be compressed can be obtained. The set of images can include a first image and a second image. At block 404, a first image file can be generated based on the set of images. The first image is encoded in a first color channel associated with the image file. The second image is encoded in a second color channel associated with the image file. At block 406, a video file can be generated based at least in part on the image file. At block 408, the video file can be provided to a client device over one or more computer networks.

FIG. 4B illustrates a flowchart of another example method 450, according to various embodiments of the present disclosure. The method 450 may be implemented in various environments including, for example, the environment 100 of FIG. 1A. The operations of method 450 presented below are intended to be illustrative. Depending on the implementation, the example method 450 may include additional, fewer, or alternative steps performed in various orders or in parallel. The example method 450 may be implemented in various computing systems or devices including one or more processors.

At block 452, an encoded video file can be accessed. A first video frame of the encoded video file can encode a first image file can be accessed. At block 454, the first image file can be extracted from the first video frame of the encoded video file, wherein the first image file encodes at least a first tile of a first tiled frame in a first color channel and a first tile of a second tiled frame in a second color channel. At block 456, at least the first tile of the first tiled frame and the first tile of the second tiled frame can be extracted from the first image file. At block 458, access to at least the first tile of the first tiled frame and the first tile of the second tiled frame can be provided.

FIG. 5 illustrates an application of adjusting of compression techniques and/or tile sizes based on available bandwidth, a predicted bandwidth (hereinafter "bandwidth" to refer to available current bandwidth and/or predicted bandwidth) and/or current traffic and/or future predicted traffic (hereinafter "traffic" to refer to current traffic and/or predicted traffic) within the network 150, and/or based on a required, desired, or specified latency or frame rate. For example, if an available bandwidth and/or a predicted bandwidth over the network 150 is high and/or a current traffic or future predicted traffic across the network 150 is low, then a compression technique having a smaller compression ratio, and/or no additional compression beyond mapping of each WAMI frame tile into a color channel, may be applied. In some examples, a future traffic may be predicted based on a type, nature, and/or a number of other computing jobs scheduled to occur and/or files scheduled to be transmitted over the network 150 over a given future duration, period, or moment of time. Meanwhile, a future bandwidth may be predicted based on any of historical bandwidth, a time during the day, and/or environmental conditions such as a level of wind. Additionally or alternatively, tiles having a small tile size and a high zoom level, which would entail a higher number of tiles, may be transmitted over the network 150 in such a scenario. The rationale for the aforementioned is that when the available bandwidth is high and/or the traffic over the network 150 is low, a larger amount of data may be transmitted without interruption or with limited interruption across the network 150. This larger amount of data may correspond to, or translate to, a higher number of tiles and/or data that is compressed to a smaller extent. Additionally, if a specified latency is low, meaning that a low degree of latency is permitted, then a compression technique having a smaller compression ratio, and/or no additional compression beyond mapping of each WAMI frame tile into a color channel, may be applied. Additionally or alternatively, tiles having a small tile size and a high zoom level, which would entail a higher number of tiles, may be transmitted over the network 150 in such a scenario. Thus, if a low degree of latency is permitted, faster compression and processing techniques may be applied.

However, a compression technique, an extent or degree of compression, and/or a tile size may be adjusted based on changes in available bandwidth and/or traffic over the network 150 or a particular channel or a subdivision of the network 150. For example, if the available bandwidth decreases and/or the current traffic increases, then the compression technique may be adjusted to one having a larger compression ratio. Additionally or alternatively, each WAMI frame tile may be mapped into four possible channels, for example, by encoding into a CMYK image file, instead of three channels, for example, when encoded into a RGB or YUV image file, to increase the compression ratio. For example, a mapping scheme may be switched from one that encodes or maps the WAMI frame tiles as RGB or YUV image files to one that encodes or maps the WAMI frame tiles as CMYK image files. Additionally or alternatively, tile sizes may be increased compared to the previous scenario. Because a tile size increase may entail a lower resolution or zoom level for each tile, increasing a tile size may still result in a same file size or amount of detail in each tile. If the available bandwidth decreases and/or the traffic over the network 150 increases, a smaller amount of data may be transmitted without interruption or with limited interruption across the network 150. This smaller amount of data may correspond to, or translate to, a smaller number of tiles and/or data that is compressed to a larger extent. Additionally or alternatively, if the permitted latency decreases, then the compression technique may be adjusted to one having a smaller compression ratio to reduce compression and/or processing time. Additionally or alternatively, tile sizes may be increased compared to the previous scenario.

Conversely, if the available bandwidth increases and/or the traffic over the network 150 decreases, then the compression technique may be adjusted to one having a larger compression ratio. Additionally or alternatively, each WAMI frame tile may be mapped into three possible channels, for example, by encoding into a RGB or YUV image file, instead of four channels, for example, when encoded into a CMYK image file, to decrease the compression ratio, because the network 150 may be able to support a larger file or data size. Additionally or alternatively, tile sizes may be decreased compared to the previous scenario, such that an increased number of tiles may be transmitted for a given video segment. Rationale for the above is that if the available bandwidth increases and/or the traffic over the network 150 decreases, a larger amount of data may be transmitted without interruption or with limited interruption across the network 150. This larger amount of data may correspond to, or translate to, a higher number of tiles and/or data that is compressed to a smaller extent. Additionally or alternatively, if the permitted latency decreases, then the compression technique may be adjusted to one having a larger compression ratio to reduce compression and/or processing time. Additionally or alternatively, tile sizes may be decreased compared to the previous scenario.

In FIG. 5, a first scenario illustrates transmission of a media file 504 across a first transmission channel 502. When a bandwidth of the first transmission channel 502 increases, as illustrated in a second transmission channel 512, the media file 504 may be modified to have a higher zoom level, smaller tile sizes, and/or a larger number of tiles, as illustrated in a first modified media file 514. An extent of a change in a number of tiles may be approximately proportional to an extent of an increase in bandwidth. For example, if bandwidth doubles then a number of tiles in a given media file may double. Additionally, as illustrated in a third transmission channel 522, in which a bandwidth has decreased with respect to the second transmission channel 512, the first modified media file 514 may be modified into a second modified media file 524, in which a number of tiles, and/or a zoom level, has decreased compared to the first modified media file 514.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

LANGUAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
obtaining a set of frames representing a view of one or more geographic regions, wherein each frame comprises a plurality of tiles;
mapping, from the set of frames, corresponding tiles of first k successive frames to respective color channels, wherein k denotes a number of the color channels;
encoding the mapped tiles of the first k successive frames within the color channels into a first image file;
subsequent mapping and encoding from the set of frames, comprising:
mapping corresponding tiles of any one or more subsequent k successive frames, beyond the first k successive frames, to the respective color channels, and encoding the mapped tiles of the any one or more subsequent k successive frames within the color channels into any one or more subsequent image files; and
for additional remaining m successive frames beyond the first k successive frames or the any one or more subsequent k successive frames, wherein m is less than k, selectively mapping corresponding tiles of the additional m successive frames to first m respective color channels until all the frames have been mapped, wherein selectively mapping comprises selectively encoding the additional m successive frames into an additional image file, wherein the corresponding tiles comprise a subset of the plurality of tiles representing the one or more geographic regions;
generating a first video frame based on the first image file, and any one or more subsequent video frames based on the any one or more subsequent image files and selectively generating any additional video frame based on the any additional image file, wherein the first video frame, the any subsequent video frames, and the any additional video frame comprise nonconsecutive tiled image frames;
generating a video file based at least in part on the first video frame, the any subsequent video frames and the any additional video frame; and distributing the video file to a first client device over one or more computer networks without playing the video file.

2. The system of claim 1, wherein the selectively mapping comprises mapping the subsequent m frames or removing the subsequent m frames without mapping based on a ratio between m and a total number of the frames.

3. The system of claim 1, wherein each frame of the set of frames corresponds to a wide-area motion image of a portion of the one or more geographic regions, and the instructions further cause the system to perform:
segmenting each image frame into a respective set of tiles, wherein each tile in the respective set of tiles has a same pixel height and a same pixel width, and wherein each tile that is mapped corresponds to one of the respective set of tiles.

4. The system of claim 3, wherein a first wide-area motion image and a second wide-area motion image were captured successively in time.

5. The system of claim 3, wherein the first wide-area motion image and the second wide-area motion image correspond to a particular zoom level at which the one or more geographic regions were imaged, wherein the instructions further cause the one or more processors to determine a number of tiles in the respective set based on the particular zoom level.

6. The system of claim 1, wherein the instructions further cause the system to perform:
associating the video file with the one or more geographic regions and a timestamp indicating when the set of frames were captured; and
storing the video file.

7. The system of claim 6, wherein the instructions further cause the system to perform:
determining a request for image data associated with the one or more geographic regions from a second client device;
determining the stored video file satisfies the request from the second client device; and
providing the video file to the second client device over one or more computer networks.

8. A computing device comprising:
one or more processors; and
a memory storing instructions that, when executed by the one or more processors, cause the computing device to perform:
accessing an encoded video file comprising a first video frame, any one or more subsequent video frames and any additional video frame, wherein the first video frame encodes a first image file, the any one or more subsequent video frames encode any one or more subsequent image files, and the any additional video frame encodes any additional image file, and wherein the first video frame, the any one or more subsequent video frames, and the any additional video frame comprise nonconsecutive tiled image frames, and the encoded video file is not played;
extracting the first image file from the first video frame of the encoded video file by decoding the first video frame, wherein the first image file encodes corresponding tiles of first k successive frames within respective color channels, k denoting a number of the color channels;
extracting the any one or more subsequent image files from the any one or more subsequent video frames and the any additional image file from the any additional video frame of the encoded video file by decoding the any one or more subsequent video frames and the any one or more subsequent video frames, wherein the any one or more subsequent image files encode corresponding tiles of any subsequent k successive frames, beyond the first k successive frames, within the respective color channels, and the any additional image file encodes the additional remaining m successive frames beyond the any subsequent k successive frames within first m respective color channels of the k color channels, m being less than k, wherein each frame of the first k successive frames, each frame of the any subsequent k successive frames and each frame of the remaining m successive frames comprises a plurality of tiles, and the corresponding tiles comprise a subset of the plurality of tiles representing the one or more geographic regions.

9. The computing device of claim 8, wherein the first image file is a Joint Photographic Experts Group (JPEG) image file.

10. The computing device of claim 8, wherein the successive frames are in grayscale.

11. The computing device of claim 8, wherein the successive frames are captured successively in time.

12. A computer-implemented method, wherein the method is performed using one or more processors, the method comprising:

obtaining a set of frames representing a view of one or more geographic regions, wherein each frame comprises a plurality of tiles;

mapping, from the set of frames, corresponding tiles of first k successive frames to respective color channels, wherein k denotes a number of the color channels;

encoding the mapped tiles of the first k successive frames within the color channels into a first image file;

subsequent mapping and encoding from the set of frames, comprising:

mapping corresponding tiles of any one or more subsequent k successive frames, beyond the first k successive frames, to the respective color channels, and encoding the mapped tiles of the any one or more subsequent k successive frames within the color channels into any one or more subsequent image files; and for additional remaining m successive frames beyond the first k successive frames or the any one or more subsequent k successive frames, wherein m is less than k, selectively mapping corresponding tiles of the additional m successive frames to first m respective color channels until all the frames have been mapped, wherein selectively mapping comprises selectively encoding the additional m successive frames into an additional image file, wherein the corresponding tiles comprise a subset of the plurality of tiles representing the one or more geographic regions;

generating a first video frame based on the first image file, and any one or more subsequent video frames based on the any one or more subsequent image files and selectively generating any additional video frame based on the any additional image file, wherein the first video frame, the any subsequent video frames, and the any additional video frame comprise nonconsecutive tiled image frames;

generating a video file based at least in part on the first video frame, the any subsequent video frames and the any additional video frame; and distributing the video file to a first client device over one or more computer networks without playing the video file.

13. The computer-implemented method of claim 12, wherein the set of frames are grayscale images.

14. The computer-implemented method of claim 12, wherein each frame of the set of frames corresponds to a wide-area motion image of a portion of the one or more geographic regions, and further comprising:

segmenting each image frame into a respective set of tiles, wherein each tile in the respective set of tiles has a same pixel height and a same pixel width, and wherein each tile that is mapped corresponds to one of the respective set of tiles.

15. The computer-implemented method of claim 12, wherein a first wide-area motion image and a second wide-area motion image were captured successively in time.

16. The computer-implemented method of claim 12, further comprising:

associating the video file with the one or more geographic regions and a timestamp indicating when the set of frames were captured; and storing the video file.

17. The computer-implemented method of claim 16, further comprising:

determining a request for image data associated with the one or more geographic regions from a second client device;

determining the stored video file satisfies the request from the second client device; and providing the video file to the second client device over one or more computer networks.

18. The system of claim 1, wherein the additional remaining m successive frames comprise last remaining frames.

* * * * *